US012791368B2

(12) United States Patent
Bayazit et al.

(10) Patent No.: US 12,791,368 B2
(45) Date of Patent: Nov. 10, 2026

(54) FLOW CONTROL AND MEASUREMENT THROUGH PARTICLE COUNTERS

(71) Applicant: TSI Incorporated, Shoreview, MN (US)

(72) Inventors: Yilmaz Bayazit, Minneapolis, MN (US); Tyler Anderson, Roseville, MN (US); Richard J. Remiarz, Vadnais Heights, MN (US)

(73) Assignee: TSI Incorporated, Shoreview, MN (US)

( * ) Notice: Subject to any disclaimer, the term of this patent is extended or adjusted under 35 U.S.C. 154(b) by 124 days.

(21) Appl. No.: 18/028,608

(22) PCT Filed: Sep. 27, 2021

(86) PCT No.: PCT/US2021/052137

§ 371 (c)(1),
(2) Date: Mar. 27, 2023

(87) PCT Pub. No.: WO2022/067154

PCT Pub. Date: Mar. 31, 2022

(65) Prior Publication Data

US 2023/0366709 A1 Nov. 16, 2023

Related U.S. Application Data

(60) Provisional application No. 63/084,397, filed on Sep. 28, 2020.

(51) Int. Cl.

*G01F 1/44* (2006.01)
*G01F 1/36* (2006.01)
(Continued)

(52) U.S. Cl.

CPC ................ *G01F 1/44* (2013.01); *G01F 1/363* (2013.01); *G01N 1/2273* (2013.01); *G01N 1/24* (2013.01); *G01F 1/42* (2013.01)

(58) Field of Classification Search

CPC ........................ G01F 1/34–54; G01N 1/22–26
See application file for complete search history.

(56) References Cited

U.S. PATENT DOCUMENTS 3,794,909 A 2/1974 Smith
5,184,501 A * 2/1993 Lewis .................. G01N 1/2252 73/23.31
(Continued)

FOREIGN PATENT DOCUMENTS

CN 104792373 A * 7/2015
EP 2237016 A2 10/2010
(Continued)

OTHER PUBLICATIONS

"European Application Serial No. 21795132.6, Response filed Nov. 27, 2023 to Communication pursuant to Rules 161(1) and 162 EP", 18 pgs.
(Continued)

*Primary Examiner* — Justin N Olamit
(74) *Attorney, Agent, or Firm* — Schwegman Lundberg & Woessner, P.A.

(57) ABSTRACT

Disclosed herein are systems and methods for measuring and controlling a flow rate through a particle counter or active air sampler. As disclosed herein, a fluid flows through a venturi tube and an orifice in the system at a predetermine velocity. A pressure differential between an inlet of the instrument and a throat section of the venturi tube is measured. The flow rate through the system can be determined based on the pressure differential and an intensive property of the fluid. An alarm can be activated when the flow rate is outside of a flow rate range.

26 Claims, 10 Drawing Sheets

(51) Int. Cl.

| | |
|---|---|
| ***G01N 1/22*** | (2006.01) |
| ***G01N 1/24*** | (2006.01) |
| *G01F 1/42* | (2006.01) |

(56) References Cited

U.S. PATENT DOCUMENTS

| | | | | |
|---|---|---|---|---|
| 6,213,853 | B1 * | 4/2001 | Gonzalez-Martin | H01L 21/02052 257/E21.228 |
| 6,431,014 | B1 | 8/2002 | Liu et al. | |
| 6,546,812 | B2 * | 4/2003 | Lewis | G01F 1/363 73/863.02 |
| 8,307,845 | B2 * | 11/2012 | Kouchi | G01F 1/363 700/282 |
| 8,800,383 | B2 * | 8/2014 | Bates | G01F 1/363 73/861.61 |
| 10,139,318 | B2 | 11/2018 | Calio et al. | |
| 11,988,543 | B2 * | 5/2024 | Hidaka | G01F 1/363 |
| 2010/0138168 | A1 * | 6/2010 | Pinguet | G01F 1/88 73/861.63 |

FOREIGN PATENT DOCUMENTS

| | | | | |
|---|---|---|---|---|
| JP | 2013502596 | | 7/2014 | |
| KR | 20060023120 | A * | 3/2006 | H01J 61/52 |
| WO | WO-02093114 | A1 | 11/2002 | |
| WO | WO-2007144835 | A2 | 12/2007 | |
| WO | WO-2011025763 | A1 | 3/2011 | |
| WO | WO-2019181061 | A1 * | 9/2019 | |
| WO | WO-2022067154 | A1 | 3/2022 | |

OTHER PUBLICATIONS

"International Application Serial No. PCT/US2021/052137, International Preliminary Report on Patentability mailed Apr. 6, 2023", 11 pgs.

"International Application Serial No. PCT/US2021/052137, International Search Report mailed Jan. 28, 2022", 5 pgs.

"International Application Serial No. PCT/US2021/052137, Written Opinion mailed Jan. 28, 2022", 9 pgs.

Thorn, Richard, "Flow measurement: 28.1 Differential pressure flow meters", CRC Press LLC,, (Dec. 31, 1999), 4-8.

"European Application Serial No. 21795132.6, Communication Pursuant to Article 94(3) EPC mailed Mar. 6, 2025", 11 pgs.

"Korean Application Serial No. 10-2023-7014804, Notice of Preliminary Rejection mailed Feb. 26, 2025", W/English Translation, 6 pgs.

"Korean Application Serial No. 10-2023-7014804, Response filed Apr. 28, 2025 to Notice of Preliminary Rejection mailed Feb. 26, 2025", w/ English Claims, 38 pgs.

"European Application Serial No. 21795132.6, Response filed Jul. 7, 2025 to Communication Pursuant to Article 94(3) EPC mailed Mar. 6, 2025", 15 pgs.

"Korean Application Serial No. 10-2023-7014804, Response filed Mar. 18, 2026 to Notice of Preliminary Rejection mailed Nov. 20, 2025", w/ English Claims, 16 pgs.

"Korean Application Serial No. 10-2023-7014804, Notice of Preliminary Rejection mailed Nov. 20, 2025", With English Machine Translation, 12 pgs.

"U.S. Appl. No. 18/028,608, Response filed Dec. 31, 2025 to Non Final Office Action mailed Nov. 19, 2025", 16 pgs.

* cited by examiner

FLOW CONTROL AND MEASUREMENT THROUGH PARTICLE COUNTERS

CLAIM OF PRIORITY

This application is a U.S. National Stage Filing under 35 U.S.C. § 371 from International Patent Application Serial No. PCT/US2021/052137, filed Sep. 27, 2021, published on Mar. 31, 2022 as WO2022/067154 which application claims the benefit of priority of U.S. Provisional Patent Application Ser. No. 63/084,397, filed on Sep. 28, 2020, all of which are herein incorporated by reference in their entireties.

FIELD OF THE DISCLOSURE

The present disclosure relates generally to systems and method for measuring and controlling fluid flow. More specifically, the present disclosure relates to measuring and controlling fluid flow through particle counters and active air samplers.

BACKGROUND

Particle counters and active air samplers are devices that can be used to measure air quality. Particle counters and active air samplers measure air quality by measuring contaminates within the air. Example environments where particle counters and active air samplers may be used include cleanrooms, laboratories, and healthcare facilities.

BRIEF DESCRIPTION OF THE FIGURES

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
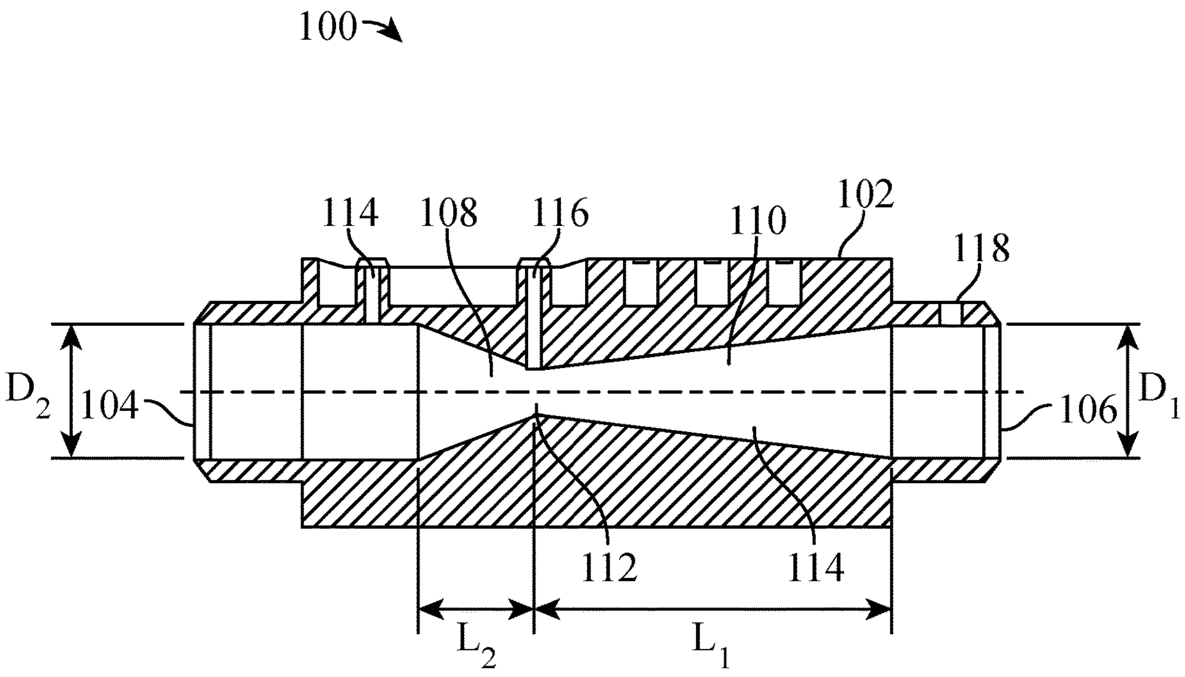
FIG. 1 illustrates a cross-section view of a venturi tube in accordance with at least one example of this disclosure.

The current disclosure relates to optical particle counters (OPC) and active air samplers (AAS) and the measurement and control of flow through these devices. In an OPC or an AAS instrument, the flow can be controlled via an orifice or a pump. In the case of the orifice, the velocity can be limited when a downstream pressure is less than or equal to about 50% to about 55% of the upstream pressure. For example, a sonic velocity through the orifice can be obtained when the pressure downstream of the orifice is about 52.8% of the upstream pressure or lower.

By selecting a size of the orifice and providing sufficient vacuum to draw air through the system and the orifice, a desired flow rate can be achieved. For controlling the flow via a pump, a flow measuring device and a controller, such as a proportional integral derivative (PID) control loop can be used to drive the pump to maintain nominal flow, which can be calibrated with a reference flow meter at the inlet. As used herein, a pump can include a pump, blower, fan, or any other device arranged to cause airflow through an OPC or an AAS.

In both of the aforementioned cases, the flow measurements can be based on a pressure drop through a restriction upstream of the flow-control element. As disclosed herein, the pressure drop across an inlet nozzle can be used to measure the flow. Because the pressure drop across the restriction is not recovered, it is desirable to keep the pressure drop across the flow measuring device small to reduce the size of the pump or increase the battery life of the device. One difficulty with a small pressure drop is that pressure transducers typically are less accurate at low pressure drops, primarily due to zero drift.

The systems and methods disclosed herein include a flow-measurement element (FME). The FME can include a venturi tube, independent from the flow controlling mechanism, while also allowing for the measurement of the ambient pressure and the absolute pressure at the inlet to the venturi tube. The venturi tube provides a larger pressure drop for the actual flow measurement, while recovering most of the pressure drop over the length of the FME, thereby minimizing the overall pressure drop across the FME.

As disclosed herein, a flow measurement architecture for an instrument can include absolute pressure measurements at the inlet of the FME, the pressure differential between the entry and the minimum area of the FME, and an ambient pressure measurement to determine if there are any restrictions at the inlet of the instrument.

In summary, the FME disclosed herein provides a highly sensitive and accurate flow measurement with minimal pressure drop. This can be accomplished with a geometry that creates a significant pressure drop from the inlet of the FME to the minimum area, while minimizing the pressure drop across the entire FME.

The above discussion is intended to provide an overview of subject matter of the present patent application. It is not intended to provide an exclusive or exhaustive explanation of the invention. The description below is included to provide further information about the present patent application.

Turning now to the figures, FIG. 1 illustrates a cross-section view of a venturi tube 100 in accordance with at least one example of the present disclosure. Venturi tube 100, also known as a Herschel tube, can include a body 102. Body 102 can define an inlet 104 and an outlet 106. Inlet 104 and outlet 106 can be fluidly coupled via a converging section 108, a diverging section 110, and a throat section 112 located in between converging section 108 and diverging section 110. Converging section 108 can include a smooth gradual contraction from a main pipe size to throat section 112. Diverging section 110 can include a smooth gradual enlargement from throat section 112 to the original pipe diameter.

During operation, a fluid can enter inlet 104 and pass through converging section 108 and into throat section 112. While passing through converging section 108 and throat section 112, the fluid can experience a pressure drop at throat section 112. Upon entering diverging section 110, the pressure of the fluid can increase. As shown in FIG. 1, the length, $L_1$, of diverging section 110 is greater than the length, $L_2$, of converging section 108. When the diameter, $D_1$, of outlet 106 and the diameter, $D_2$, of inlet 104 are the same, the increased length of diverging section 110 helps minimize losses associate with separation of the fluid from the surfaces forming diverging section 110 and inefficient mixing within diverging section 110. The result is pressure losses, sometimes referred to as head losses, within venturi tube 100 can minimized to only friction losses associated the fluid flowing through venturi tube 100. Stated another way, the construction of venturi tube 100 can allow for the pressure drop or a pressure differential to be measured at throat section 112 while allowing for nearly all of the pressure drop to be recovered in diverting section 110. For a well designed and constructed venturi tube, the pressure difference between inlet 104 and outlet 106 will be nearly equal. As a result, measuring the pressure differential, either directly, or indirectly, may be desirable.

For example, venturi tube 100 can include a first pressure opening 114, a second pressure opening 116, and a third pressure opening 118. During operation, as the fluid flows through venturi tube 100, pressure differential measurements can be made via differential pressure transducers. For instance, a differential pressure transducer can be used to measure the pressure differential between first pressure opening 114 and second pressure opening 116.

Directly measuring the pressure differential with differential pressure transducers may be desirable to minimize errors. For example, while the pressure differential can be determined by measuring pressures at first pressure opening 114 and second pressure opening 116 and calculating the difference, this method can cause large errors. For example, a typical pressure drop of 4 kPa across the venturi can occur. Ambient air pressure is typically around 100 kPa. Pressure transducer accuracy can be a percentage of reading (e.g., about 2% for reasonably priced pressure transducers). Thus, a measurement of 4 kPa would have an accuracy of around 0.08 kPa. Measuring the individual pressures at first pressure opening 114 and second pressure opening could result in measurements of about 100 kPa and 96 kPa. With a 2% accuracy pressure transducer, each reading would be accurate to about 2 kPa. Thus, the overall error would be about 2.8 kPa, which is over 30 times higher than the error from using a differential pressure transducer. Thus, depending on an acceptable error, higher accuracy pressure transducers may be needed to measure pressures directly and calculate the pressure differential.

The Bernoulli equation, shown as Eq. 1, and the Conservation of Mass, simplified and shown in Eq. 2, can be used to determine a flow rate through venturi tube 100.

Using substitutions, the Bernoulli equation can be solved to determine the velocity at inlet 104 in terms of parameters of venturi tube 100.

$$p_{inlet} + \frac{\rho v_{inlet}^2}{2} = p_{throat} + \frac{\rho v_{throat}^2}{2} \quad \text{(Eq. 1)}$$

-continued $$A_{inlet} * v_{inlet} = A_{throat} * v_{throat} \quad \text{(Eq. 2)}$$

In Eqs. 1 and 2, p is the pressure of the fluid, ρ is the density of the fluid, v is the velocity of the fluid, and A is the area. Eq.2 can be substituted into Eq.1 to eliminate one unknown.

$$p_{inlet} + \frac{\rho v_{inlet}^2}{2} = p_{throat} + \frac{\rho * \left(\frac{A_{inlet} * v_{inlet}}{A_{throat}}\right)^2}{2} \quad \text{(Eq. 3)}$$

Now, Eq.3 can be further simplified to determine velocity at inlet 104 as shown in Eqs. 4A, 4B, and 4C.

$$p_{inlet} - p_{throat} = \frac{\rho * \left(\frac{A_{inlet} * v_{inlet}}{A_{throat}}\right)^2}{2} - \frac{\rho v_{inlet}^2}{2} \quad \text{(Eq. 4A)}$$

$$\Delta p = \frac{\rho * \left(\frac{A_{inlet} * v_{inlet}}{A_{throat}}\right)^2}{2} - \frac{\rho v_{inlet}^2}{2} \quad \text{(Eq. 4B)}$$

$$v_{inlet} = \sqrt{\frac{2 * \Delta p}{\rho}} * \sqrt{\frac{1}{\left(\frac{A_{inlet}}{A_{throat}}\right)^2 - 1}} \quad \text{(Eq. 4C)}$$

The volumetric flow rate at inlet 104 can be calculated as shown in Eq. 5.

$$Q_{inlet} = A_{inlet} * v_{inlet} \quad \text{(Eq. 5)}$$

Q is the volumetric flow rate. Now Eq.4C can be substituted into Eq.5 as shown in Eq. 6.

$$Q_{inlet} = \sqrt{\frac{2 * \Delta p}{\rho}} * \sqrt{\frac{A_{inlet}^2}{\left(\frac{A_{inlet}}{A_{throat}}\right)^2 - 1}}$$

Now that the volumetric flow at inlet 108 of venturi tube 100 is calculated, volumetric flow at the head (i.e., upstream of venturi tube 100) can also be calculated using mass conservation (Eq. 7) and Ideal Gas Law (Eq. 8).

From mass conservation:

$$\rho_{amb} * Q_{head} = \rho_{inlet} * Q_{inlet} \quad \text{(Eq. 7)}$$

From Ideal Gas Law, the density of the fluid is directly proportional to pressure as:

$$p = \rho RT \quad \text{(Eq. 8)}$$

The density at each location (i.e., first, second, and third pressure opening 114, 116, and 118) can be calculated and used with Eq. 6 to calculate the flow rate as shown in Eq. 9 or the density terms can be replaced with the pressure at each location as shown in Eq. 10.

$$Q_{head} = \frac{p_{inlet}}{p_{amb}} * \sqrt{\frac{2 * \Delta p}{\rho}} * \sqrt{\frac{A_{inlet}^2}{\left(\frac{A_{inlet}}{A_{throat}}\right)^2 - 1}} \quad \text{(Eq. 9)}$$

Finally, substituting Eq.6 into Eq.9, we arrive at the flow at the head.

$$Q_{head} = \frac{p_{inlet} * Q_{inlet}}{p_{amb}} \quad \text{(Eq. 10)}$$

Using the equations above and venturi tube 100, the flow rate of air or other gasses can be determined.

Figure 2A:
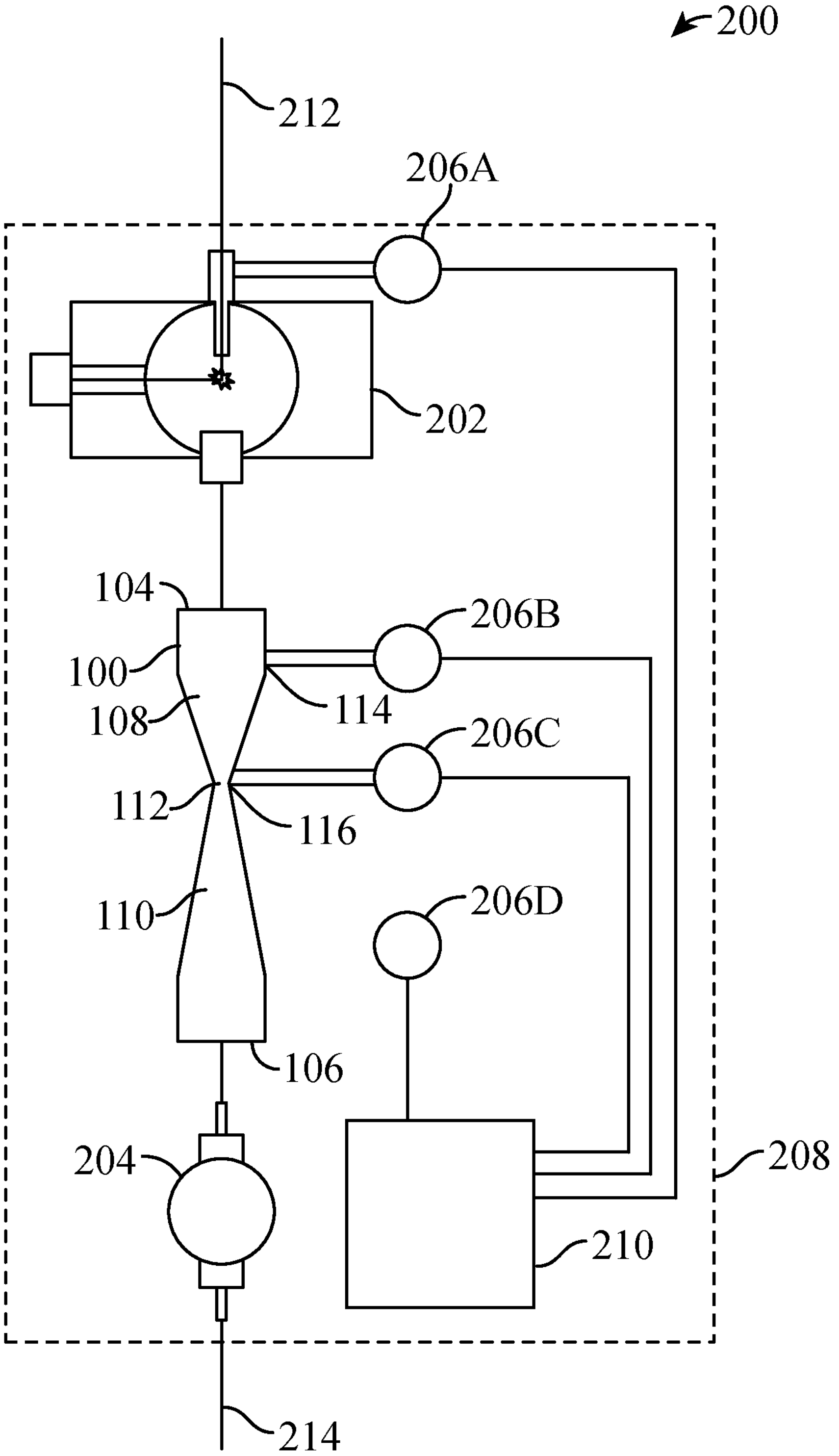
FIG. 2A illustrates a schematic of a system in accordance with at least one example of this disclosure.
Figure 2B:
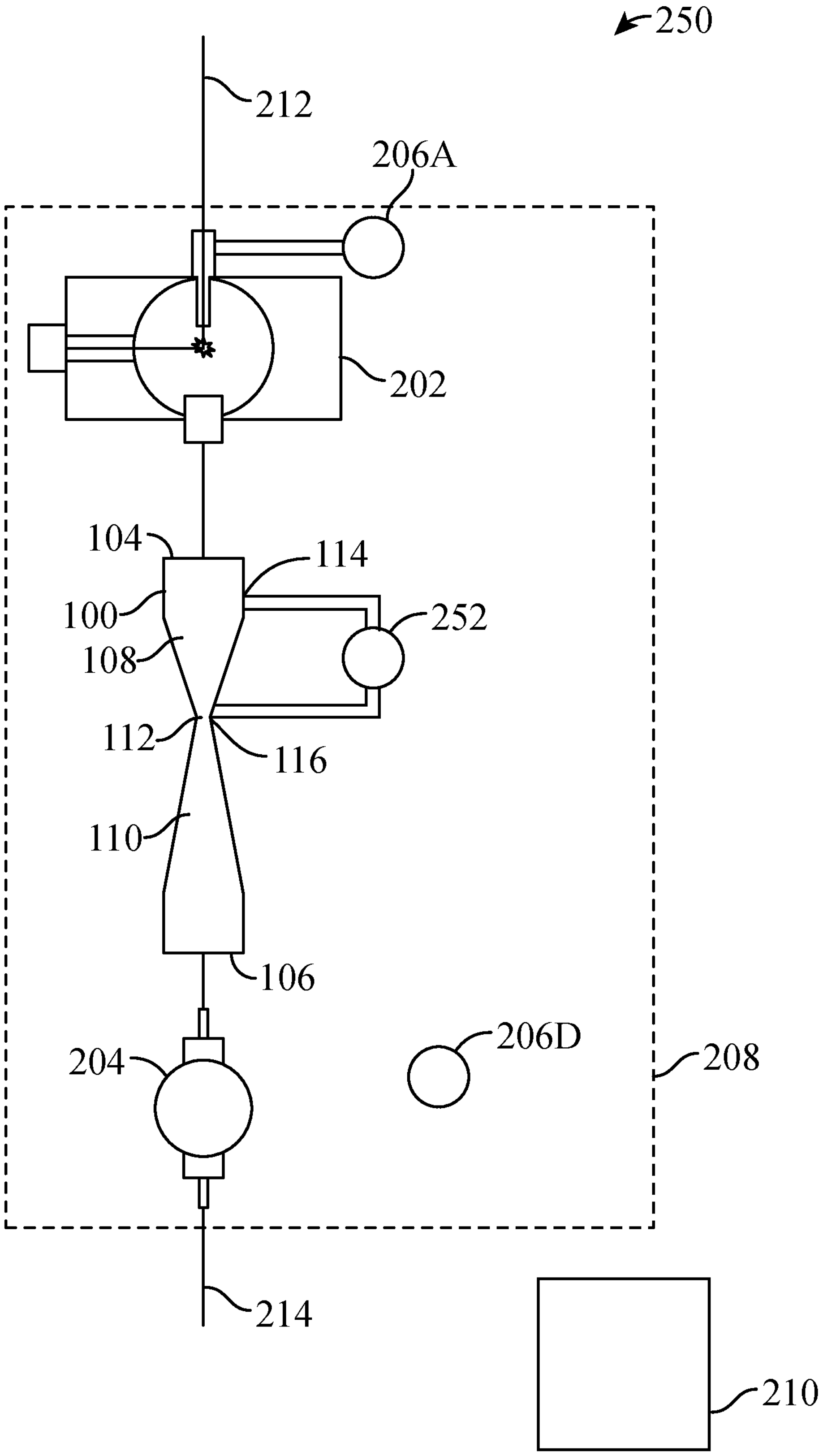
FIG. 2B illustrates a schematic of a system in accordance with at least one example of this disclosure.

FIG. 2A illustrates a schematic for a system 200 for measuring and/or controlling a flow in accordance with at least one example of this disclosure. System 200 can include venturi tube 100, a particle counter 202, a pump 204, and pressure transducers 206 (labeled individually as 206A, 206B, 206C, and 206D). The various components of system 200 can be enclosed within a housing 208. System 200 can also include a controller 210, which can be located inside housing 208 as shown in FIG. 2A or exterior to housing 208. The pressure transducers 206 can be electrically coupled to the controller via wires as shown in FIG. 2A or via wireless connections as shown in FIG. 2B.

During operation, pump 204 can cause a fluid, such as air, to flow through system 200. For example, pump 204 can be located downstream from venturi tube 100 and create a vacuum upstream of pump 204 to draw the fluid into system 200 via opening 212. After flowing through system 200, the fluid can be expelled from system 200 via an exhaust 214.

Pressure transducers 206A, 206B, and 206C can measure the pressure upstream of particle counter 202 and the pressure differential between the inlet and the throat section 112, respectively, as the fluid flows through system 200. For example, pressure transducer 206A can measure absolute pressure, 206B can measure pressure at inlet 104, pressure transducer 206C can measure pressure at throat section 112. Pressure transducer 206D can measure the ambient pressure. Each of the pressure transducers 206 can transmit a signal (e.g., a voltage) to controller 210, which can in turn convert the signal to a pressure using a calibration equation or lookup tables. Controller 210 can use the various pressures and intensive properties of the fluid (e.g., the density) to calculate the flow rate, volumetric flow rate and/or mass flow rate, using Eqs. 1-10. The intensive properties of the fluid can be stored in a memory of controller or calculated using appropriate thermodynamic state equations or lookup tables.

As disclosed herein, pump 204 can be controlled to deliver a preset flow rate. For example, pump 204 can be driven by controller 210 to deliver a flow rate of X liters per minute. For instance, to maintain a specific flow rate, controller 210, which can be a PID controller, can drive pump 204 using the output of the flow measurement. Controller 210 can drive the flow to the set point. Should the flow not be maintained to within +/−5% of the specific flow rate an alarm can be indicated.

During operation, controller 210 can continuously receive signals from the pressure transducers 206 and monitor the flow rate. Should the flow rate deviate outside the preset range of flow rates (i.e., +/−5% of the specific flow rate), controller 210 can transmit a signal to an alarm, such a light and/or speaker, to notify an operator of a potential problem. For example, using the ambient pressure in conjunction with the other pressure measurements and intensive properties of the fluid, a change in flow can be equated to a kink or other blockage in piping of the system. Upon activating the alarm, service personnel or the operator can inspect the system for blockages, kinked tubes, and/or other abnormalities within the system that could be causing the flow rate to be outside the preset flow rate range.

Controller 210 can also transmit signals to pump 204 to alter the flow rate. For example, if the flow rate exceeds a preset flow rate then controller 210 can transmit a signal to retard pump 204 to lower the flow rate. Should the flow rate be less than a preset flow rate then controller 210 can transmit a signal to increase a pump speed to increase the flow rate through system 200.

FIG. 2B illustrates a schematic for a system 250 for measuring and/or controlling a flow in accordance with at least one example of this disclosure. System 250 can include venturi tube 100, particle counter 202, pump 204, pressure transducers 206 (labeled individually as 206A and 206D) and a differential pressure transducer 252. The various components of system 250 can be enclosed within housing 208. System 250 can also include controller 210, which can be located exterior to housing 208 as shown in FIG. 2B or interior to housing 208 as shown in FIG. 2A. Pressure transducers 206 can be electrically coupled to controller 210 via wires as shown in FIG. 2A or via wireless connections as shown in FIG. 2B.

During operation, pump 204 can cause a fluid, such as air, to flow through system 250. For example, pump 204 can be located downstream from venturi tube 100 and create a vacuum upstream of pump 204 to draw the fluid into system 250 via opening 212. After flowing through system 250, the fluid can be expelled from system 250 via an exhaust 214.

Pressure transducers 206A and 206D can measure absolute pressures. For example, pressure transducer 206A can measure absolute pressure and pressure transducer 206D can measure the ambient pressure. Differential pressure transducer 252 can directly measure the pressure differential between inlet 104 (e.g. at first pressure opening 114) and throat section 112 (e.g., at second pressure opening 116).

Each of the pressure transducers 206 and differential pressure transducer 252 can transmit a signal (e.g., an electromagnetic signal) to controller 210, which can in turn convert the signal to a pressure using a calibration equation or lookup tables. Controller 210 can use the various pressures, pressure differentials, and intensive properties of the fluid (e.g., the density) to calculate the flow rate, volumetric flow rate and/or mass flow rate, using Eqs. 1-10. The intensive properties of the fluid can be stored in a memory of controller or calculated using appropriate thermodynamic state equations or lookup tables.

As disclosed herein, pump 204 can be controlled to deliver a preset flow rate. For example, pump 204 can be driven by controller 210 to deliver a flow rate of X liters per minute. For instance, to maintain a specific flow rate, controller 210, which can be a PID controller, can drive pump 204 using the output of the flow measurement as part of a control loop. Controller 210 can drive the flow to the set point. Should the flow not be maintained to within +/−5% of the specific flow rate an alarm can be indicated.

During operation, controller 210 can continuously receive signals from the pressure transducers 206 and monitor the flow rate. Should the flow rate deviate outside the preset range of flow rates (i.e., +/−5% of the specific flow rate), controller 210 can transmit a signal to an alarm, such a light and/or speaker, to notify an operator of a potential problem.

For example, using the ambient pressure in conjunction with the other pressure measurements and intensive properties of the fluid, a change in flow can be equated to a kink or other blockage in piping of the system. Upon activating the alarm, service personnel or the operator can inspect the system for blockages, kinked tubes, and/or other abnormalities within the system that could be causing the flow rate to be outside the preset flow rate range.

Controller 210 can also transmit signals to pump 204 to alter the flow rate. For example, if the flow rate exceeds a preset flow rate then controller 210 can transmit a signal to retard pump 204 to lower the flow rate. Should the flow rate be less than a preset flow rate then controller 210 can transmit a signal to increase a pump speed to increase the flow rate through system 200.

Figure 3A:
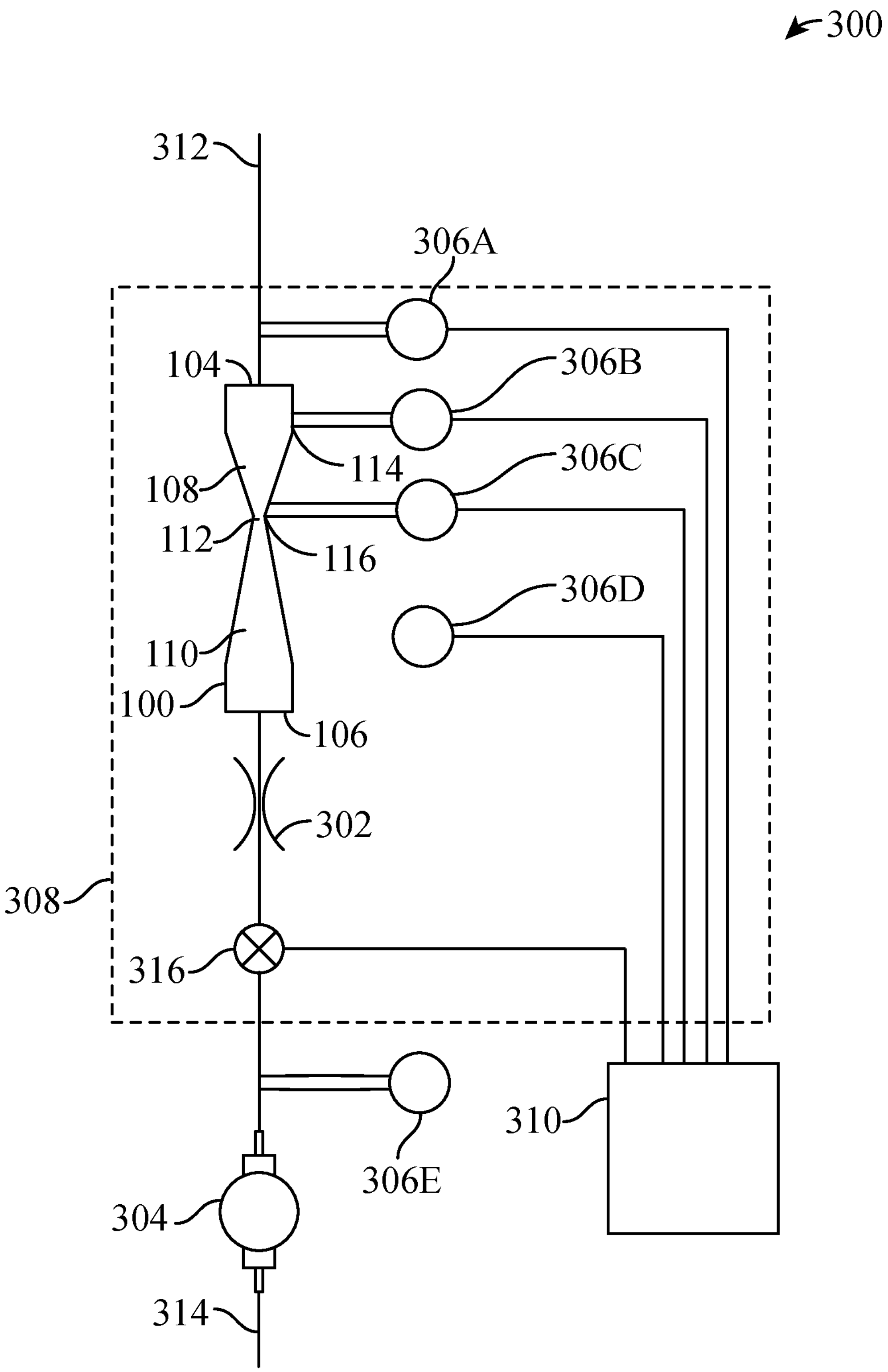
FIG. 3A illustrates a schematic of a system in accordance with at least one example of this disclosure.
Figure 3B:
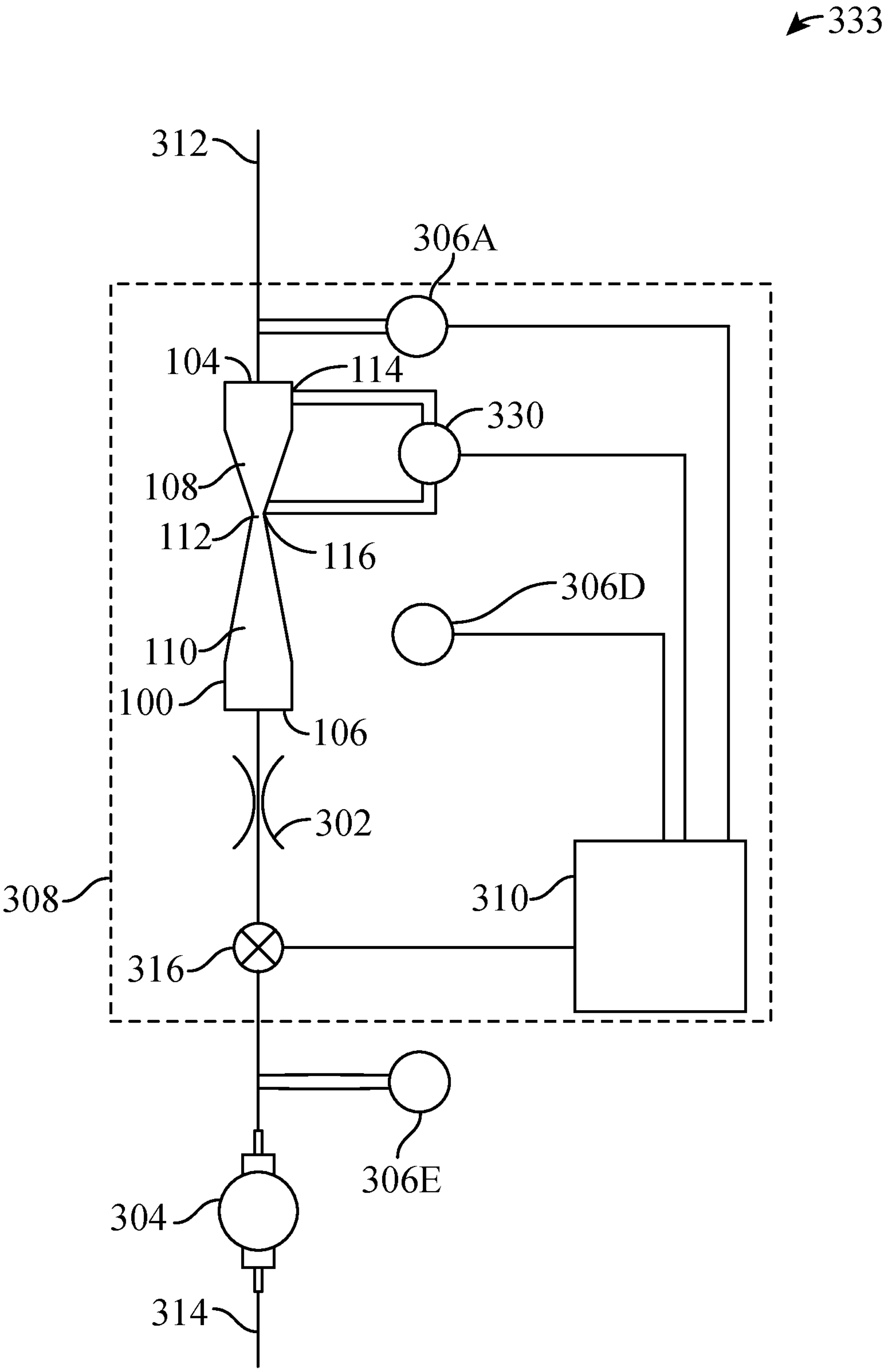
FIG. 3B illustrates a schematic of a system in accordance with at least one example of this disclosure.

FIG. 3A illustrates a schematic for a system 300 for measuring and/or controlling a flow in accordance with at least one example of this disclosure. System 300 can include venturi tube 100, an orifice 302, a pump 304, and pressure transducers 306 (labeled individually as 306A, 306B, 306C, and 306D). The various components of system 300 can be enclosed within a housing 308. System 300 can also include a controller 310, which can be located outside housing 308 as shown in FIG. 3A or interior to housing 308 as shown in FIG. 3B. The pressure transducers 306 can be electrically coupled to the controller via wires as shown in FIG. 3A.

During operation, pump 304 can cause a fluid, such as air, to flow through system 300. For example, pump 304 can be located downstream from venturi tube 100 and create a vacuum upstream of pump 304 to draw the fluid into system 300 via opening 312. Opening 312 can be connected to an AAS, a particle detector, or other instrumentation. While not shown in FIG. 3A, the AAS, particle detector, or other instrumentation can be external or internal to housing 308. After flowing through system 300, the fluid can be expelled from system 300 via an exhaust 314.

Pressure transducers 306A, 306B, and 306C can measure the pressure upstream of venturi tube 100, an inlet 104, and throat section 112, respectively, as the fluid flows through system 300. Pressure transducer 306D can measure the ambient pressure. Each of the pressure transducers 306 can transmit a signal (e.g., a voltage) to controller 310, which can in turn convert the signal to a pressure using a calibration equation or lookup tables. Controller 310 can use the various pressures and intensive properties of the fluid (e.g., the density) to calculate the flow rate, volumetric flow rate and/or mass flow rate, using Eqs. 1-10. The intensive properties of the fluid can be stored in a memory of controller or calculated using appropriate thermodynamic state equations or lookup tables.

Orifice 302, sometimes called a critical orifice, is used to control the velocity of the fluid flowing through system 300. For example, pump 304 can be used to create a vacuum that draws the fluid thought system 300 a constant velocity controlled by the size of orifice 302. For instance, if a vacuum is maintained that is greater than about 50% to about 55%, such as 52.8%, then the fluid will flow through system 300 and orifice 302 at a sonic velocity that is constant. Stated another way, any increases in vacuum will not cause an increase in velocity, but a decrease in vacuum will cause a reduction in velocity of the fluid through system 300.

A decrease in velocity will result in a change in the pressure drop through venturi tube 100 as well. The change in pressure drop through venturi tube 100 (i.e., the pressure differential between pressure transducer 306B and pressure transducer 306C) can be used to accurately measure the flow through an instrument, such as an OPC or AAS.

During operation, controller 310 can continuously receive signals from the pressure transducers 306 and monitor the flow rate. Should the flow rate deviate outside the preset range of flow rates, controller 310 can transmits a signal to an alarm, such a light and/or speaker, to notify an operator of a potential problem. For example, using the ambient pressure in conjunction with the other pressure measurements and intensive properties of the fluid, a change in flow can be equated to a kink or other blockage in piping of the system. Upon activating the alarm, service personnel or the operator can inspect the system for blockages, kinked tubes, and/or other abnormalities within system 300 that could be causing the flow rate to be outside the preset flow rate range.

As disclosed herein, orifice 302 can be used to maintain the flow rate. Pump 304 can be one of a plurality of vacuum pumps that operate to ensure the vacuum is no lower than 52.8% of the ambient pressure. For example, the vacuum pumps can be part of a manifolded system where one or more vacuum pumps draw vacuum in a vacuum line. The vacuum line can be connected to multiple particle counters, AAS, etc.

System 300 can also include a valve 316. Valve 316 can be a solenoid valve or other valve that can be actuated by controller 310. During operation controller 310 can open to allow flow through system 300 and/or close to discontinue flow through system 300.

FIG. 3B illustrates a schematic for a system 333 for measuring and/or controlling a flow in accordance with at least one example of this disclosure. System 333 can include venturi tube 100, orifice 302, pump 304, pressure transducers 306 (labeled individually as 306A and 306D), and a differential pressure transducer 330. The various components of system 333 can be enclosed within housing 308. System 333 can also include controller 310, which can be located outside housing 308 as shown in FIG. 3A or interior to housing 308 as shown in FIG. 3B. The pressure transducers 306 and differential pressure transducer 330 can be electrically coupled to the controller via wires as shown in FIG. 3B.

During operation, pump 304 can cause a fluid, such as air, to flow through system 333. For example, pump 304 can be located downstream from venturi tube 100 and create a vacuum upstream of pump 304 to draw the fluid into system 333 via opening 312. Opening 312 can be connected to an AAS, a particle detector, or other instrumentation. While not shown in FIG. 3B, the AAS, particle detector, or other instrumentation can be external or internal to housing 308. After flowing through system 333, the fluid can be expelled from system 333 via an exhaust 314.

Pressure transducer 306A can measure the pressure upstream of venturi tube 100 as the fluid flows through system 333. Pressure transducer 306D can measure the ambient pressure. Differential pressure transducer 330 can measure a differential pressure between inlet 104 (i.e. at first pressure opening 114) and throat section 112 (i.e., at second pressure opening 116). Each of the pressure transducers 306 and differential pressure transducer 330 can transmit a signal (e.g., a voltage) to controller 310, which can in turn convert the signal to a pressure or differential pressure using a calibration equation or lookup tables. Controller 310 can use the various pressures, pressure differentials, and intensive properties of the fluid (e.g., the density) to calculate the flow rate, volumetric flow rate and/or mass flow rate, using Eqs. 1-10. The intensive properties of the fluid can be stored in a memory of controller or calculated using appropriate thermodynamic state equations or lookup tables.

Orifice 302 is used to control the velocity of the fluid flowing through system 333 as described above with respect system 300. For example, pump 304 can be used to create a vacuum that draws the fluid thought system 333 a constant velocity controlled by the size of orifice 302.

A decrease in velocity will result in a change in the pressure drop through venturi tube 100 as well. The change in pressure drop through venturi tube 100 as measured by differential pressure transducer 330 can be used to accurately measure the flow through an instrument, such as an OPC or AAS.

During operation, controller 310 can continuously receive signals from the pressure transducers 306 and differential pressure transducer 330 and monitor the flow rate. Should the flow rate deviate outside the preset range of flow rates, controller 310 can transmits a signal to an alarm, such a light and/or speaker, to notify an operator of a potential problem. For example, using the ambient pressure in conjunction with the other pressure measurements and intensive properties of the fluid, a change in flow can be equated to a kink or other blockage in piping of the system. Upon activating the alarm, service personnel or the operator can inspect the system for blockages, kinked tubes, and/or other abnormalities within system 333 that could be causing the flow rate to be outside the preset flow rate range.

As disclosed herein, orifice 302 can be used to maintain the flow rate. Pump 304 can be one of a plurality of vacuum pumps that operate to ensure the vacuum is no lower than 52.8% of the ambient pressure. For example, the vacuum pumps can be part of a manifolded system where one or more vacuum pumps draw vacuum in a vacuum line. The vacuum line can be connected to multiple particle counters, AAS, etc.

System 333 can also include a valve 316. Valve 316 can be a solenoid valve or other valve that can be actuated by controller 310. During operation controller 310 can open to allow flow through system 333 and/or close to discontinue flow through system 333.

Figure 3C:
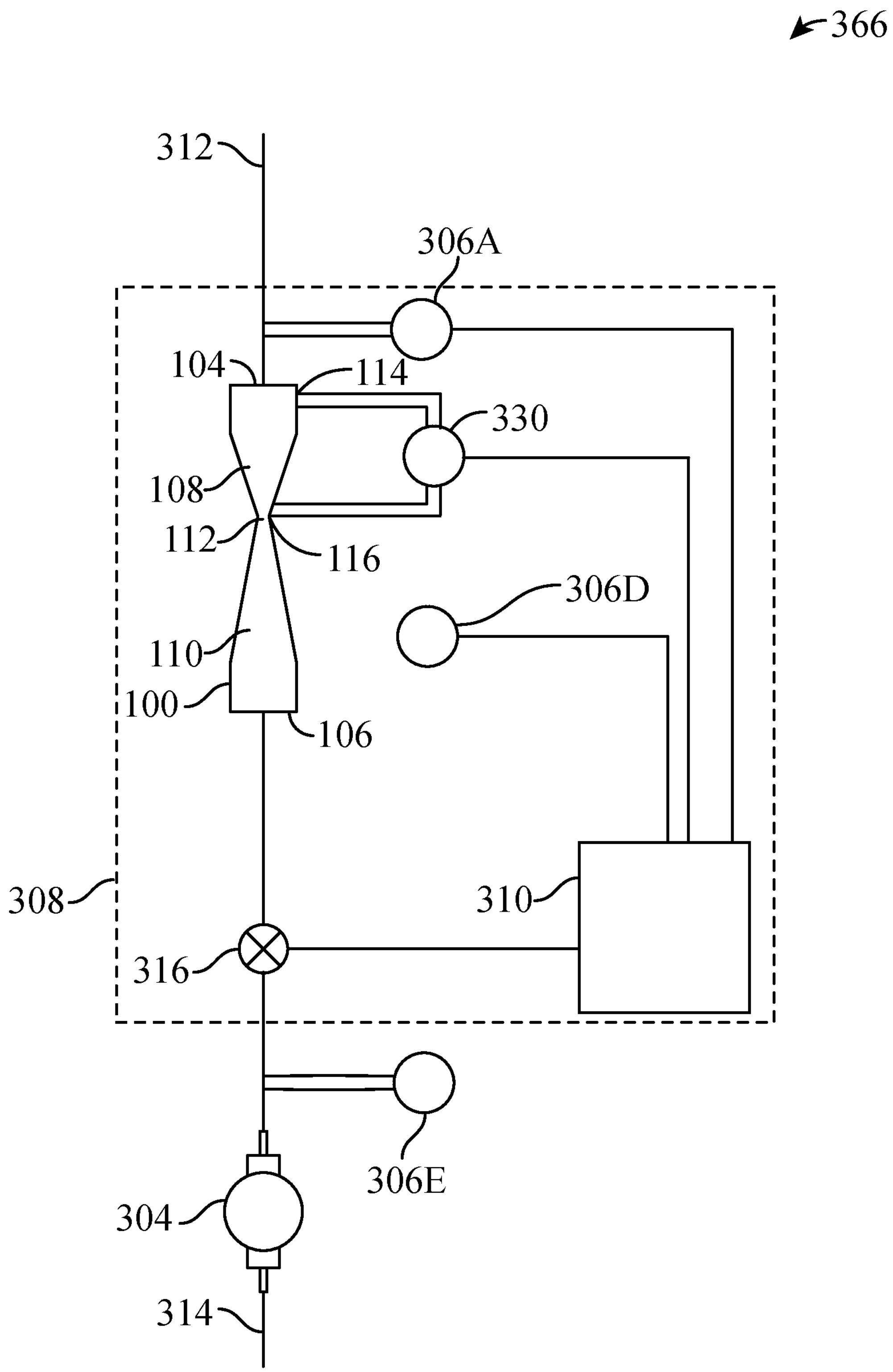
FIG. 3C illustrates a schematic of a system in accordance with at least one example of this disclosure.

FIG. 3C illustrates a schematic for a system 366 for measuring and/or controlling a flow in accordance with at least one example of this disclosure. System 366 can include venturi tube 100, pump 304, pressure transducers 306 (labeled individually as 306A and 306D), differential pressure transducer 330, and valve 316. The various components of system 366 can be enclosed within housing 308. System 366 can also include controller 310, which can be located outside housing 308 as shown in FIG. 3A or interior to housing 308 as shown in FIG. 3C. The pressure transducers 306, differential pressure transducer 330, and valve 316 can be electrically coupled to the controller via wires as shown in FIG. 3B or wirelessly as shown in FIG. 3C.

During operation, pump 304 can cause a fluid, such as air, to flow through system 366. For example, pump 304 can be located downstream from venturi tube 100 and create a vacuum upstream of pump 304 to draw the fluid into system 366 via opening 312. Opening 312 can be connected to an AAS, a particle detector, or other instrumentation. While not shown in FIG. 3C, the AAS, particle detector, or other instrumentation can be external or internal to housing 308. After flowing through system 333, the fluid can be expelled from system 333 via an exhaust 314.

Pressure transducer 306A can measure the pressure upstream of venturi tube 100 as the fluid flows through system 333. Pressure transducer 306D can measure the ambient pressure. Differential pressure transducer 330 can measure a differential pressure between inlet 104 (i.e. at first pressure opening 114) and throat section 112 (i.e., at second pressure opening 116). Each of the pressure transducers 306 and differential pressure transducer 330 can transmit a signal (e.g., a voltage) to controller 310, which can in turn convert the signal to a pressure or differential pressure using a calibration equation or lookup tables. Controller 310 can use the various pressures, pressure differentials, and intensive properties of the fluid (e.g., the density) to calculate the flow rate, volumetric flow rate and/or mass flow rate, using Eqs. 1-10. The intensive properties of the fluid can be stored in a memory of controller or calculated using appropriate thermodynamic state equations or lookup tables.

Valve 316 can be a controllable valve controlled by controller 310. For example, controller 310 can operate a PID loop that controls the degree to which valve 316 is open or closed. As a result, valve 316 can be used to control the velocity of the fluid flowing through system 366. For example, pump 304 can be used to create a vacuum that draws the fluid thought system 366 at a constant velocity controlled by the degree to which valve 316 is open. For instance, when valve 316 is fully open, a flow rate of X lpm may be obtained and when valve 316 is 50% open, a flow rate of Y lpm may be obtained.

Should there be a change in velocity, a change in the pressure drop through venturi tube 100 will occur. The change in pressure drop through venturi tube 100 as measured by differential pressure transducer 330 can be used to accurately measure the flow through an instrument, such as an OPC or AAS.

During operation, controller 310 can continuously receive signals from the pressure transducers 306 and differential pressure transducer 330 and monitor the flow rate. Should the flow rate deviate outside the preset range of flow rates, controller 310 can transmits a signal to an alarm, such a light and/or speaker, to notify an operator of a potential problem. For example, using the ambient pressure in conjunction with the other pressure measurements and intensive properties of the fluid, a change in flow can be equated to a kink or other blockage in piping of the system. Upon activating the alarm, service personnel or the operator can inspect the system for blockages, kinked tubes, and/or other abnormalities within system 333 that could be causing the flow rate to be outside the preset flow rate range.

In addition to signaling alarms, controller 310 can open or close valve 316 in an attempt to increase or decrease the flow rate. For example, if there is an obstruction upstream of system 366, controller 310 can open valve 316 in an attempt to increase the flow rate. By opening valve 316, the piping system can be visually inspected for kinks or other damage without having to shut down system 366. Once the obstruction is located system 366 can be taken offline for repairs.

Figure 4:
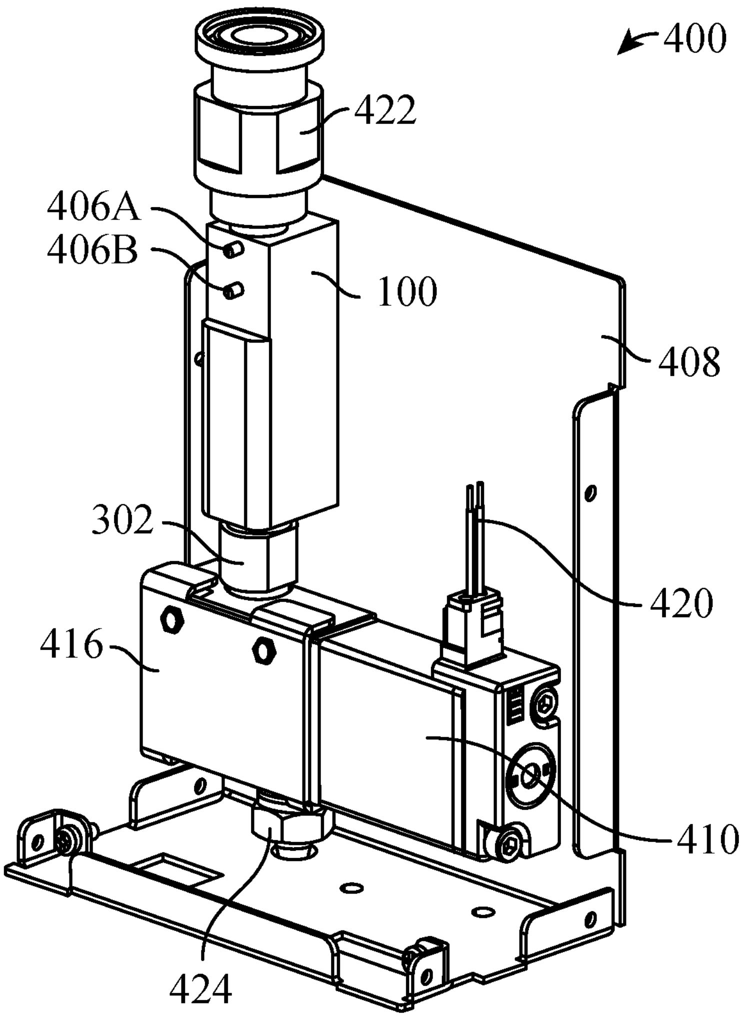
FIG. 4 illustrates a system in accordance with at least one example of this disclosure.

FIG. 4 illustrates a system 400 in accordance with at least one example of this disclosure. System 400, which can be a representation of systems 200 and 300 and can include venturi tube 100, an orifice 302, pressure transducers, differential pressure transducers, a controller 410, and a valve 416. The various components of system 400 can be enclosed within a housing 408 (portions of housing 408 are not shown for clarity). Controller 410 can include electrical connection 420 that can be connected to external controllers, alarms, power sources, etc.

During use system 400 can be connected to a second system (not show), such as an AAS, or an OPC located within housing 408, that is to be calibrated or otherwise monitored using system 400 via an inlet 422. An exit 424 can be connected vacuum system. For example, exit 424 can be connected to a house vacuum source to draw air through system 400. Both inlet 422 and/or exit 424 can be quick connectors, threaded connectors, etc.

Figure 5:
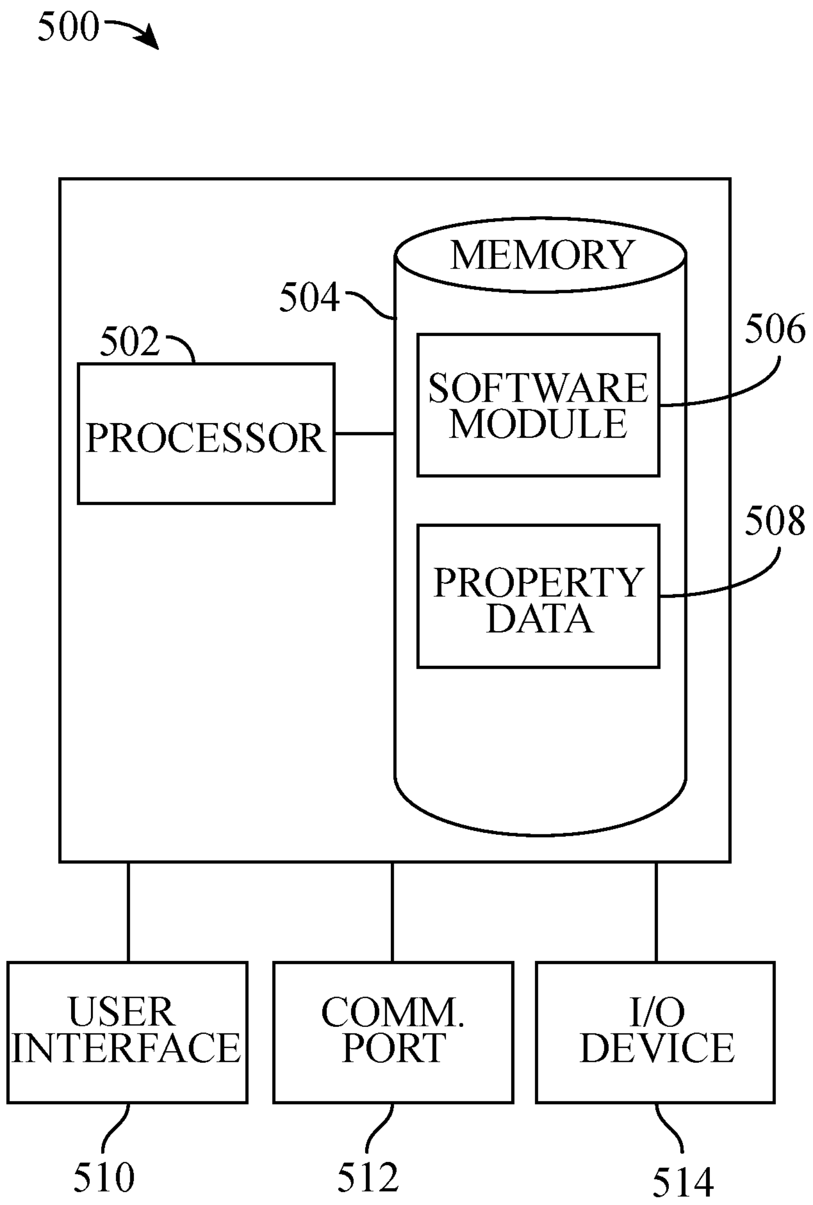
FIG. 5 illustrates a schematic of a controller in accordance with at least one example of this disclosure.

FIG. 5 illustrates a schematic of a controller 500, such as controller 210, 310, or 410, in accordance with at least one example of this disclosure. Controller 500 can include a processor 502 and a memory 506. Memory 506 can include a software module 508 and property data 508. While executing on processor 504, software module 506 can perform a process or processes for measuring and/or controlling a flow rate of a fluid through a system, including, for example, one or more stages included in a method 600 described below with respect to FIG. 6. Controller 500 can also include one or more user interfaces 510, one or more communications ports 512, and one or more input/output (I/O) devices 514.

As disclosed herein, software module 506 can include instructions that, when executed by processor 502, cause controller 500 to receive signals. For example, pressure transducers, such as those described herein, can transmit signals to controller 500, which can be received via I/O devices 514 or communications ports 512. The instructions, when executed by processor 502, can cause controller to transmit signals. For example, controller 500 can transmit signals to user interfaces 510, communications ports 512, and/or I/O devices 514 to activate alarms, display system information, control a valve to turn the flow on or off, or control pumps.

Property data 508 can include intensive property data for the fluid as well as properties of venturi tubes and other components of the systems disclosed herein. For example, property data 508 can include lookup tables or equations used to convert signals, such as voltages, received from pressure and/or pressure transducers to pressures and/or temperatures. In addition, property data 508 can include the diameter of a venturi tube inlet, exit, and throat section. Other non-limiting examples of property data 508 can include operating vacuum pressures, desired flow rates, and/or desired or preset flow rate ranges at which the various systems disclosed herein are to operate.

User interface 510 can include any number of devices that allow a user to interface with controller 500. Non-limiting examples of user interface 510 include a keypad, a microphone, a display (touchscreen or otherwise), etc.

Communications port 512 may allow controller 500 to communicate with various information sources and devices, such as, but not limited to, remote computing devices such as servers or other remote computers, mobile devices such as a user's smart phone, peripheral devices, etc. Non-limiting examples of communications port 512 include, Ethernet cards (wireless or wired), Bluetooth® transmitters and receivers, near-field communications modules, etc.

I/O device 514 may allow controller to receive and output information. Non-limiting examples of I/O device 514 include, pressure and temperature transducers, alarms (visual and/or audible), cameras (still or video), etc.

Figure 6:
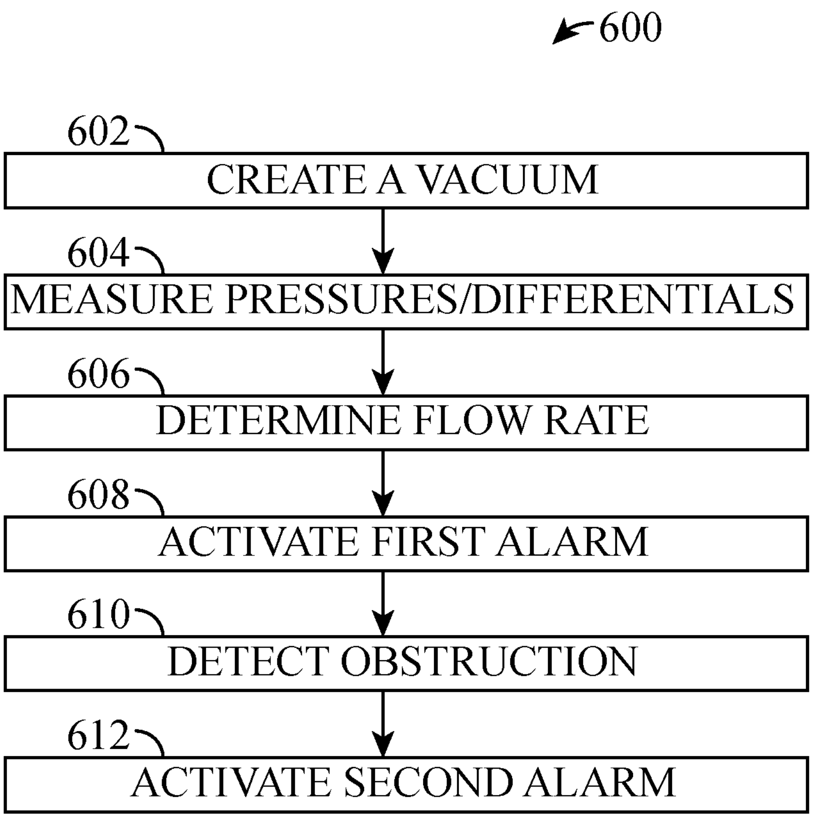
FIG. 6 illustrates a method in accordance with at least one example of this disclosure.

FIG. 6 illustrates a method 600 in accordance with at least one example of this disclosure. Method 600 can begin at stage 602 where a vacuum is created to draw a fluid through a system, such as systems 200, 300, or 400. As disclosed herein, creating a vacuum can include activating a vacuum pump to create a vacuum and draw a fluid into and through the system. For instance, a pump can create a vacuum downstream of a venturi tube and an orifice in a particle counter, active air sampler, or other device to draw a fluid through the venturi tube and the orifice at a predetermine velocity.

Creating the vacuum can include drawing the fluid through the system and orifice at a sonic or near sonic velocity as disclosed herein. For example, a vacuum that is about 52% of ambient pressure can be created to draw the fluid through the system and orifice at a sonic or near sonic velocity.

As the fluid flows through the system, various pressures and pressure differentials can be measured (604). For example, a first pressure in the system upstream of the venturi tube can be measure and a pressure differential between the inlet and at a throat section of the venturi tube can be measured. In addition, the ambient pressure can be measured.

The flow rate through the system can be determined based on the first pressure, the pressure differential, and intensive properties of the fluid (606). For example, as disclosed herein, a controller, such as controller 210, 310, 410, or 500, can use the various pressure readings as well as property data, such as property data 508 and Eqs. 1-10 to calculate the flow rate, volumetric or mass flow rate, through the system. If the flow rate is outside of a flow rate range, a first alarm can be activated (608).

As disclosed herein, the various pressure measurements can also be used to determine if there is an obstruction in the system (610) and a second alarm activated (612) when an obstruction is detected. For example, using the ambient pressure, the flow rate, and the inlet pressure, an obstruction such as a kink in the tubing or other blockage within the system can be detected.

Figure 7:
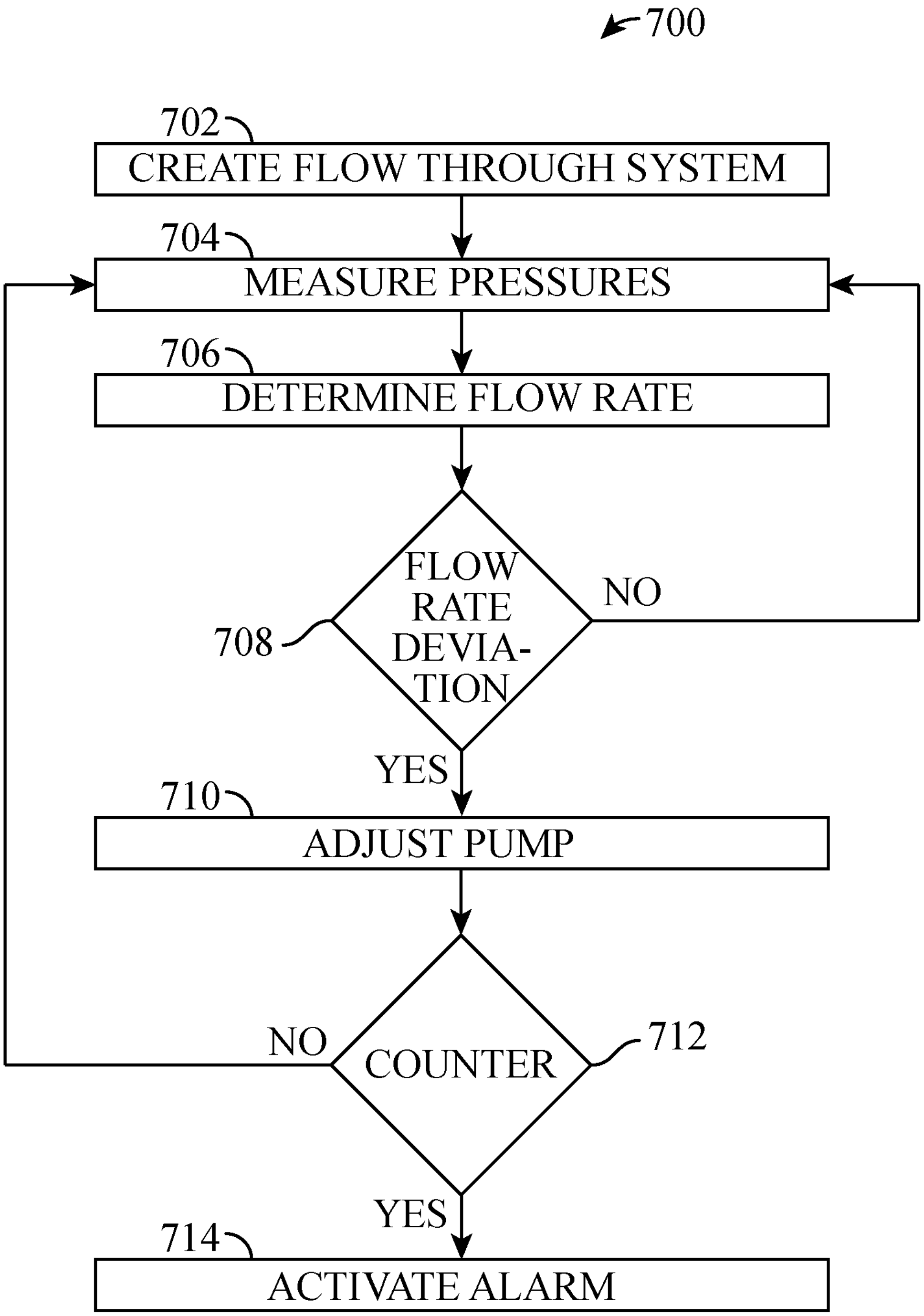
FIG. 7 illustrates a method in accordance with at least one example of this disclosure.

FIG. 7 illustrates a method 700 in accordance with at least one example of this disclosure. Method 700 can begin at stage 702 where a flow is created through a system, such as systems 200, 300, or 400. As disclosed herein, creating a flow can include activating a blower to push a fluid through the system at a predetermine velocity.

As the fluid flows through the system, various pressures can be measured (704). For example, a first pressure in the system upstream of the venturi tube can be measure and a pressure differential between the inlet and at a throat section of the venturi tube can be measured. In addition, the ambient pressure can be measured.

The flow rate through the system can be determined based on the first pressure, the pressure differential, and intensive properties of the fluid (706). For example, as disclosed herein, a controller, such as controller 210, 310, 410, or 500, can use the various pressure readings as well as property data, such as property data 508 and Eqs. 1-10 to calculate the flow rate, volumetric or mass flow rate, through the system.

From stage 706 method 700 can proceed to a feedback loop where a determination can be made if the flow rate deviates from a desired flow rate (708). If the flow rate has not deviated from the desired flow rate, method 700 can return to stage 704 where the various pressures and pressure differentials can be measured and the flow rate determined (706).

If the flow rate has deviated, the blower can be adjusted to increase or decrease the flow rate (710). For example, the flow rate may be outside a flow rate range because the blower driving the flow has wear or otherwise deteriorated performance and/or there is an obstruction in a piping network of the system. As a result, the controller can transmit a signal to the blower to increase or decrease the blower speed to return the flow rate to the desired flow rate.

After adjusting the blower, method 700 can proceed to a counter determination (712) where a determination can be made if the loop has cycled a preset number of times or for a preset time period. If the counter has not cycled the preset number of times or for a preset time period, method 700 can return stage 704 where the various pressures and pressure differentials can be measured, the flow rate determined (706), and a determination can be made as to whether or not the flow rate has deviated from the desired flow rate (708).

Should the blower not be able to increase the flow rate or otherwise fail to adjust the flow rate after a predetermine time or a predetermined number of cycles, an alarm can be activated (714). The counter (712) can allow the controller to first attempt to adjust the flow rate before activating an alarm. Activation of the alarm can be an indication that there is an obstruction in the system or other problem with the blower that may require service or other maintenance.

The design of systems 200, 300, and 400 solve a number of issues found in particle counters or active air samplers. Particle counters and active air samplers are designed to operate at a set volumetric sample flow rate. As disclosed herein, an orifice will maintain the proper flow rate through an instrument (either particle counters or active air samplers), as long as a large enough vacuum is maintained (e.g., less than 52.8% of atmospheric pressure) that use a vacuum source and a critical orifice to maintain flow. The pressure drop across the orifice can be monitored with pressure sensors or pressure switches to determine if the vacuum is maintained at an adequate level for critical flow.

During use, things can happen. For example, when used with a particle counter, the hose between the sampling probe and instrument may get kinked and squeezed shut. On an active air sampler, holes may get plugged with growth medium, or the hose between the sampler and the vacuum source may get kinked. This will result in a reduction in flow rate through the measurement device, since the downstream side of the orifice would be at a significantly reduced pressure, affecting the volumetric flow rate. However, the pressure drop across the orifice may not reflect the drop in flow through the sampling device. This could cause a significant undercounting of particles and degrade the performance of the measurement device due to low velocities of particles traveling through the devices. Unlike monitoring the pressure drop across the orifice, the venturi tube combined with the inlet pressure can make a direct measurement of the flow through the device, corrected to the volumetric flow rate at the inlet of the device (at atmospheric pressure).

Another problem addressed by the systems and methods disclosed herein is the accuracy of flow measurement in battery-operated portable devices, as well as the requisite pressure drop and resulting strain on an air flow system required to obtain pressure drop signals for typical flow measurements and controls. To increase battery life on portable instruments, the systems and methods disclosed herein maintain a pressure drop across the instrument as small as possible. The difficulty with a small pressure drop is that pressure transducers typically are less accurate at low pressure drops, primarily due to zero drift. The systems and methods disclosed herein, provide high sensitivity to changes in flow rate due to the area ratio between the inlet and the outlet with minimal pressure drop. This allows a more accurate flow measurement without a sacrifice in flow accuracy, while maintaining long battery life due to a low overall pressure drop.

Additionally, particle counters typically may need to periodically zero the pressure transducer to maintain flow accuracy. In a particle counter system, the pressure transducer must be zeroed with the pump shut off (i.e., no flow going through the device), otherwise the zero would be offset by any pressure drop caused by flow through the device. This causes an issue in continuous monitoring systems, and in systems measuring from atmospheres that are above or below ambient pressure, as these conditions will drive flow through the instrument even with the pump shut off. To get around this problem, in a conventional system either the instrument must be periodically disconnected from the sampling environment to zero the pressure transducer, which is difficult in clean room conditions, or the pressure transducer is not zeroed, causing inaccurate flow measurements.

The systems and methods disclosed herein have the advantage of providing a significantly higher measurement pressure drop (e.g., ~4 kPa) than the typical pressure drop across a particle counter (e.g., ~1 kPa). Because this pressure drop is recovered via the venturi tube, battery life is not degraded. As a result, higher accuracy of the flow measurement will be maintained over time in continuous monitoring applications because pressure transducer zero drift will have a smaller impact on the measurement than typical applications currently used.

Also, the use of the inlet absolute pressure sensor (e.g., pressure transducer 206A and/or 306B) with the ambient pressure sensor (e.g., pressure transducers 206D and/or 306D) provides the necessary information to determine if there is a restriction upstream of the instrument inlet. A problem with most existing devices is that the flow measurement system cannot detect if there is a significant flow blockage upstream of the instrument. Unlike mass flow rate, volumetric flow rate varies over the length of tube. If there is a restriction in the flow path leading to the instrument, for example a kinked tube or blocked holes in an active air sampler, it can go undetected in most devices. With the designed pressure transducer systems disclosed herein, restrictions or blockages are detectable in the systems or tubing leading to the systems.

Examples and Notes

The following, non-limiting examples, detail certain aspects of the present subject matter to solve the challenges and provide the benefits discussed herein, among others.

Example 1 is a method for generating a flow and measuring a flow rate of the flow through an instrument, the method comprising: creating a vacuum downstream of a venturi tube and an orifice downstream of the venturi tube to draw a fluid through the venturi tube, the orifice, and the instrument at a predetermine velocity; measuring a pressure differential between an inlet of the instrument and a throat section of the venturi tube; determining the flow rate through the instrument based on the pressure differential and an intensive property of the fluid; and activating a first alarm when the flow rate is outside of a flow rate range.

In Example 2, the subject matter of Example 1 optionally includes wherein creating the vacuum to draw the fluid through the venturi tube and the orifice at the predetermine velocity includes creating the vacuum using an external vacuum source to draw the fluid through the venturi tube and the orifice at a sonic velocity.

In Example 3, the subject matter of any one or more of Examples 1-2 optionally include % of a pressure at the inlet of the instrument.

In Example 4, the subject matter of any one or more of Examples 1-3 optionally include wherein the flow rate is a volumetric flow rate.

In Example 5, the subject matter of any one or more of Examples 1~4 optionally include measuring an ambient pressure exterior to the instrument.

In Example 6, the subject matter of Example 5 optionally includes detecting an obstruction upstream of the instrument based on the ambient pressure and the flow rate.

In Example 7, the subject matter of any one or more of Examples 1-6 optionally include wherein measuring the pressure differential comprises measuring the pressure differential with a differential pressure transducer.

In Example 8, the subject matter of any one or more of Examples 1-7 optionally include wherein measuring the pressure differential comprises: measuring a first pressure at the inlet of the instrument; measuring a second pressure at the throat section of the venturi tube; and calculating the pressure differential using the first pressure and the second pressure.

In Example 9, the subject matter of any one or more of Examples 1-8 optionally include wherein the instrument is an active air sampler.

In Example 10, the subject matter of any one or more of Examples 1-9 optionally include wherein the instrument is a particle counter.

Example 11 is a method for controlling a flow rate of a fluid through a system including an instrument, the method comprising: activating a pump to cause the fluid to flow through the system; measuring a pressure differential between an inlet of the instrument and a throat section of a venturi tube; determining the flow rate through the particle counter based on the first pressure, the second pressure, and an intensive property of the fluid; and adjusting the pump to increase or decrease the flow rate when the flow rate is outside of a flow rate range.

In Example 12, the subject matter of Example 11 optionally includes measuring an ambient pressure exterior to the instrument.

In Example 13, the subject matter of any one or more of Examples 11-12 optionally include detecting an obstruction upstream of the instrument based on the ambient pressure and the flow rate; and activating a first alarm upon detecting the obstruction.

In Example 14, the subject matter of any one or more of Examples 11-13 optionally include wherein the flow rate is a volumetric flow rate.

In Example 15, the subject matter of any one or more of Examples 11-14 optionally include wherein the pump is a vacuum pump; the system includes an orifice located downstream of the venturi tube; and activating the pump to cause the fluid to flow through the system includes activating the vacuum pump create a vacuum in the system to draw the fluid through the system and the orifice at a sonic velocity.

In Example 16, the subject matter of Example 15 optionally includes % of a pressure at the inlet of the instrument.

In Example 17, the subject matter of any one or more of Examples 11-16 optionally include wherein measuring the pressure differential comprises measuring the pressure differential with a differential pressure transducer.

In Example 18, the subject matter of any one or more of Examples 11-17 optionally include wherein measuring the pressure differential comprises: measuring a first pressure at the inlet of the instrument; measuring a second pressure at the throat section of the venturi tube; and calculating the pressure differential using the first pressure and the second pressure.

In Example 19, the subject matter of any one or more of Examples 11-18 optionally include wherein the instrument is an active air sampler.

In Example 20, the subject matter of any one or more of Examples 11-19 optionally include wherein the instrument is a particle counter.

Example 21 is a system for measuring a flow rate of a fluid through an instrument, the system comprising: a venturi tube having an inlet, an exit, and a throat located between the inlet and the exit; a differential pressure transducer operative to sense a pressure differential between the throat and a point upstream of the inlet of the venturi tube; a controller in electrical communication with the differential pressure transducer and operative to perform actions comprising: converting a first signal from the differential pressure transducer to the pressure differential, determining the flow rate through the instrument based on the pressure differential and an intensive property of the fluid, and activating a first alarm when the flow rate is outside a flow rate range.

In Example 22, the subject matter of Example 21 optionally includes a pressure transducer in electrical communication with the controller, the controller operative to perform additional actions comprising: converting a signal from the pressure transducer into an ambient pressure measurement; and detecting an obstruction upstream of the venturi tube based on the ambient pressure and the flow rate.

In Example 23, the subject matter of any one or more of Examples 21-22 optionally include an orifice located downstream of the exit, the orifice sized such that upon application of a vacuum, the fluid flows through the system at a sonic velocity; and a vacuum source in fluid communication with the orifice, the vacuum source operative to draw the fluid through the orifice at the sonic velocity.

In Example 24, the subject matter of any one or more of Examples 21-23 optionally include wherein the flow rate is a volumetric flow rate.

In Example 25, the subject matter of any one or more of Examples 21-24 optionally include a blower downstream of the venturi tube, the controller configured to transmit a fourth signal to the blower, the fourth signal operative to adjust a blower speed.

In Example 26, the subject matter of any one or more of Examples 21-25 optionally include a third pressure transducer in electrical communication with the controller, the controller operative to perform additional actions comprising: converting a signal from a third pressure transducer into an ambient pressure measurement; and detecting an obstruction upstream of the venturi tube based on the ambient pressure and the flow rate.

In Example 27, the subject matter of any one or more of Examples 21-26 optionally include the instrument in fluid communication with the inlet of the venturi tube.

In Example 28, the subject matter of Example 27 optionally includes wherein the instrument is an active air sampler located exterior to a housing of the system.

In Example 29, the subject matter of any one or more of Examples 27-28 optionally include wherein the instrument is a particle counter located within a housing of the system.

In Example 30, the subject matter of any one or more of Examples 21-29 optionally include an adjustable valve located downstream of the exit and in electrical communication with the controller; and a vacuum source in fluid communication with the adjustable valve, the vacuum source operative to draw the fluid through the adjustable valve, wherein the controller is operative to perform additional actions comprising adjusting an opening of the adjustable valve such that upon application of a vacuum, the fluid flows through the system at a sonic velocity.

In Example 31, the apparatuses or method of any one or any combination of Examples 1-30 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system to measure a flow rate of a gaseous stream through an instrument, the system comprising:

a venturi tube having an inlet, an exit, and a throat located between the inlet and the exit, the throat having a smaller cross-sectional area than both a cross-sectional area of the inlet and a cross-sectional area of the exit; the inlet being configured to be coupled pneumatically to the instrument, the instrument comprising at least one instrument selected from a particle counter and an active air sampler, the exit being configured to be coupled pneumatically to an external vacuum source comprising a pump;

a differential pressure transducer operative to sense a pressure differential between the throat and a point either at or upstream of the inlet of the venturi tube, and wherein the point is located at an inlet of the instrument;

a controller in electrical communication with the differential pressure transducer and operative to perform actions comprising:

converting a first signal from the differential pressure transducer to the pressure differential;

determining, substantially continuously, the flow rate through the instrument based on the pressure differential and at least one intensive property of a gas in the gaseous stream;

setting a flag when the flow rate is outside a flow rate range; and based on a determination that the flow rate is not within a predetermined range of the flow rate, the controller further to:

send a signal to the external vacuum source to adjust a speed of the pump up or down to adjust the flow rate to be within the predetermined range; and continue measuring the flow rate to verify that the flow rate continues to be within the predetermined range.

2. The system of claim 1, further comprising a pressure transducer in electrical communication with the controller, the controller operative to perform additional actions comprising:

converting a signal from the pressure transducer into an ambient pressure measurement; and detecting an obstruction upstream of the venturi tube based on the ambient pressure and the flow rate.

3. The system of claim 2, wherein the controller is operative to perform additional actions comprising activating an alarm upon detecting the obstruction upstream of the venturi tube.

4. The system of claim 1, further comprising:

an orifice located downstream of the exit, the orifice sized such that upon application of a vacuum, the gaseous stream flows through the system at a sonic velocity; and the external vacuum source being in pneumatic communication with the orifice, the external vacuum source being operative to draw the gaseous stream through the orifice at the sonic velocity.

5. The system of claim 1, wherein the flow rate is a volumetric flow rate.

6. The system of claim 1, wherein the external vacuum source comprises a blower downstream of the venturi tube, the controller configured to transmit a fourth signal to the blower, the fourth signal being operative to adjust a speed of the blower.

7. The system of claim 1, further comprising a third pressure transducer in electrical communication with the controller, the controller being configured to store the at least one intensive property of the gas and operative to perform additional actions comprising:

converting a signal from the third pressure transducer into an ambient pressure measurement; and detecting an obstruction upstream of the venturi tube based on the ambient pressure and the flow rate.

8. The system of claim 1, wherein the instrument is an optical particle counter.

9. The system of claim 1, further comprising:

an adjustable valve located downstream of the exit and in electrical communication with the controller;

an orifice located downstream of the exit; and the external vacuum source being in pneumatic communication with the adjustable valve and the orifice, the external vacuum source operative to draw the gaseous stream through the adjustable valve and the orifice, the vacuum source operative to draw the gaseous stream through the adjustable valve, wherein the controller is operative to perform additional actions comprising adjusting an opening of the adjustable valve such that upon application of a vacuum, the gaseous stream flows through the system at a sonic velocity.

10. The system of claim 1, wherein the at least one intensive property of the gas comprises a density of the gas.

11. The system of claim 1, wherein the at least one intensive property of the gas comprises a temperature of the gas.

12. The system of claim 1, wherein the at least one intensive property of the gas comprises an absolute pressure of the gas.

13. The system of claim 1, wherein the controller is operative to perform additional actions comprising activating an alarm when the flow rate is outside the flow rate range.

14. The system of claim 1, wherein the external vacuum source is configured to draw the gaseous stream such that a pressure downstream of the venturi tube is less than or equal to 52 percent of a pressure at an inlet of the instrument.

15. The system of claim 1, further comprising a memory in electrical communication with the controller, the memory configured to store the at least one intensive property of the gas.

16. The system of claim 1, further comprising a user interface in electrical communication with the controller, the user interface configured to output an indication of the flow rate.

17. The system of claim 1, wherein the instrument is an active air sampler.

18. The system of claim 1, further comprising a communication port in electrical communication with the controller, the communication port configured to transmit data associated with the flow rate to an external device.

19. A system to measure a flow rate of a gaseous stream through an instrument, the system comprising:

a venturi tube having an inlet, an exit, and a throat located between the inlet and the exit, the throat having a smaller cross-sectional area than both a cross-sectional area of the inlet and a cross-sectional area of the exit; the inlet being configured to be coupled pneumatically to the instrument, the instrument comprising at least one instrument selected from a particle counter and an active air sampler, the exit being configured to be coupled pneumatically to an external vacuum source comprising a pump;

a differential pressure transducer operative to sense a pressure differential between the throat and a point either at or upstream of the inlet of the venturi tube;

a controller in electrical communication with the differential pressure transducer and operative to perform actions comprising:

converting a first signal from the differential pressure transducer to the pressure differential;

determining, substantially continuously, the flow rate through the instrument based on the pressure differential and at least one intensive property of a gas in the gaseous stream;

setting a flag when the flow rate is outside a flow rate range; and based on a determination that the flow rate is not within a predetermined range of the flow rate, the controller further to:

send a signal to the external vacuum source to adjust a speed of the pump up or down to adjust the flow rate to be within the predetermined range; and continue measuring the flow rate to verify that the flow rate continues to be within the predetermined range, wherein the differential pressure transducer comprises a first pressure sensor configured to measure a first pressure at an inlet of the instrument and a second pressure sensor configured to measure a second pressure at the throat of the venturi tube.

20. The system of claim 19, further comprising a pressure transducer in electrical communication with the controller, the controller operative to perform additional actions comprising:

converting a signal from the pressure transducer into an ambient pressure measurement; and detecting an obstruction upstream of the venturi tube based on the ambient pressure and the flow rate.

21. The system of claim 19, further comprising:

an orifice located downstream of the exit, the orifice sized such that upon application of a vacuum, the gaseous stream flows through the system at a sonic velocity; and the external vacuum source being in pneumatic communication with the orifice, the external vacuum source being operative to draw the gaseous stream through the orifice at the sonic velocity.

22. The system of claim 19, wherein the at least one intensive property of the gas comprises one or more of a density of the gas, a temperature of the gas, or an absolute pressure of the gas.

23. The system of claim 19, wherein the controller is operative to perform additional actions comprising activating an alarm upon detecting an obstruction upstream of the venturi tube or when the flow rate is outside the flow rate range.

24. The system of claim 19, wherein the external vacuum source is configured to draw the gaseous stream such that a pressure downstream of the venturi tube is less than or equal to 52 percent of a pressure at an inlet of the instrument.

25. The system of claim 19, further comprising a user interface in electrical communication with the controller, the user interface configured to output an indication of the flow rate.

26. The system of claim 19, wherein the instrument is an active air sampler.

* * * * *